US007000185B1

(12) United States Patent
Murren et al.

(10) Patent No.: US 7,000,185 B1
(45) Date of Patent: Feb. 14, 2006

(54) METHOD AND SYSTEM FOR CUSTOMIZATION OF A PROGRAM

(75) Inventors: Brian Murren, Clifton Park, NY (US); Gregg Steuben, Troy, NY (US)

(73) Assignee: General Electric Capital Corporation, Stamford, CT (US)

( * ) Notice: Subject to any disclaimer, the term of this patent is extended or adjusted under 35 U.S.C. 154(b) by 790 days.

(21) Appl. No.: 09/845,757

(22) Filed: Apr. 30, 2001

(51) Int. Cl.
*G06F 17/00* (2006.01)

(52) U.S. Cl. ............... 715/536; 715/513; 717/110

(58) Field of Classification Search ........... 715/513, 715/536; 717/110
See application file for complete search history.

(56) References Cited

OTHER PUBLICATIONS

Pereira et al., "Java Server pp. 1.2", (C) 2000, www.bits-pilani.ac.in/~fx/fxjspbasics.pdf.*

* cited by examiner

*Primary Examiner*—Stephen S. Hong
(74) *Attorney, Agent, or Firm*—Buckley, Maschoff & Talwalkar LLC

(57) ABSTRACT

A method and system for preparing a program for customization. The customization system "compiles" a computer program by identifying the content of each statement of the computer program that may be customized. The customization system identifies the type associated with each statement. Based on the type of statement, the customization system identifies content of the statement that can be customized and stores the identified content in a custom content bundle. The customization system then replaces the identified content in the statement with an include content command that includes the content identifier of the corresponding content. When the computer program is executed, the include content command of the statement causes the retrieving of a content associated with its content identifier from a custom content bundle.

26 Claims, 10 Drawing Sheets

METHOD AND SYSTEM FOR CUSTOMIZATION OF A PROGRAM

TECHNICAL FIELD

The described technology relates generally to customization of a program and particularly to customization of server-executable web pages.

BACKGROUND

Computer programs are often designed so that users who speak different languages can use the computer programs. These computer programs typically provide their text information in the language of the user. A developer of a computer program may create an English version and a French version of the computer program. Alternatively, a developer of a computer program may create a language-independent version of the computer program and may also create a language file for different languages. Each language file contains the text information for one language. When the language-independent version of computer program is executed, it retrieves the appropriate text information from the language file for the language of the user. In this way, computer programs can be extended to support additional languages by creating additional language files. The process of creating a language-independent version of a computer program is referred to as "internationalization." The process of creating language files for different languages is referred to as "localization."

It may be especially important to internationalize web sites because the World Wide Web by its very nature is accessible by users throughout the world. Any user of the World Wide Web from any country can access any web site of the World Wide Web provided the user has the appropriate authorization. Moreover, since most web sites do not require authorization, most web sites are accessible to any user. Of course, a French-speaking user may not be able to effectively use a web site that is published only in English. As a result, many organizations develop different web sites for different countries or languages. These organizations typically create a new web site by creating a modified version of an existing web site that supports a new language, rather than the language of the existing web site. For example, the new language may be French, and the language of the existing web site may be English. From that point on, desired modifications need to be made to both web sites. The process of making desired modifications to multiple web sites may be expensive, time-consuming, and error prone.

Current web sites typically support dynamic generation of web pages by web servers. When a web server receives from client computers requests for web pages, the web server may generate the web page (e.g., an HTML document) on demand. One technique for server-side, dynamic generation of web pages is referred to as server-executable web pages. Examples of server-executable web pages include JavaServer Pages ("JSP's") as defined by Sun Microsystems and active server pages ("ASP's") as defined by Microsoft. The server-executable web pages such as JSP's contain elements, referred to as custom tags, that specify how to generate a web page. A server-side engine executes a JSP to generate the web page, which can then be forwarded to the requesting client computer. A JSP may include HTML tags, JSP tags, and executable code or scripts. A JSP tag identifies code that is executed on the server to generate a portion of the web page. Developers of JSP's can define custom tags that are associated with custom code written by developers. When the JSP engine encounters a custom tag, it instantiates an object associated with that custom tag, sets attributes associated with that tag, and then requests the object to generate its portion of the web page or perform some action based on the attributes passed to the tag. The attributes of a tag may be set to text strings that may need to be modified to support the localization of a web page.

Dynamic web pages, such as dynamic HTML documents, have client-side executable code. For example, a developer of a web page may want to display text information when the user moves the cursor over an image. The tag associated with the display of the image may have executable code associated with it that is invoked when the user moves the mouse over the image. When the code is invoked, it displays the text associated with the image. That text may need to be modified to support localization of the web page.

It would be desirable to have techniques to a facilitate the internationalization of computer programs in general and web pages, server-executable web pages, and dynamic web pages in particular.

DETAILED DESCRIPTION

Figure 1A:
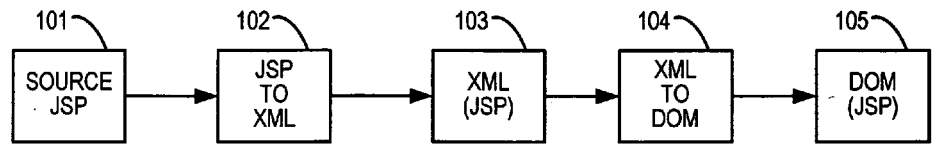
FIG. 1A is a block diagram illustrating preprocessing of a JSP before it is "compiled."

A method and system for preparing a program for customization is provided. In one embodiment, the customization is the internationalization of computer programs. The techniques of the customization system may be used, however, for other types of customization such as customization based on user age, physical disability, gender, and so on. The customization system "compiles" a computer program (e.g., JSP or ASP) by identifying the content of each statement (e.g., tag) of the computer program that may be customized. The customization system identifies the type (e.g., JSP tag) associated with each statement. Based on the type of statement, the customization system identifies content of the statement that can be customized and stores the identified content in a custom content bundle. A custom content bundle (e.g., resource bundles provided for in the Java platform released by Sun Microsystems) contains name and value pairs that map content identifiers to the corresponding content. The customization system then replaces the identified content in the statement with an include content command (e.g., an include content tag when the program is a JSP) that includes the content identifier of the corresponding content. When the computer program is executed, the include content command of the statement causes the retrieving of a content associated with its content identifier from a custom content bundle. Additional custom content bundles may be created to support the customization. For example, the initial custom content bundle may support English, and additional custom content bundles may support French, German, and so on. When the computer program is executed, the appropriate custom content bundle is accessed to effect the customization of the computer program. In this way, computer programs can be automatically "compiled" to support the customization, such as localization.

In another embodiment, the customization system provides a fine-grain customization of a computer program on a statement-by-statement basis. A computer programmer may develop a computer program with statements that rely on a default value of a customization parameter (e.g., type of language or gender) and statement-specific values of the customization parameter. For example, if the customization parameter is type of language, then the default value of the customization parameter may be "English" and a statement-specific value of the customization parameter may be "French." If a statement does not specify a value of a customization parameter, then the statement is assigned the default value. If a statement, however, does specify a customization parameter, then the statement is assigned the statement-specific value. The customization system may have a custom content bundle associated with each value of a customization parameter. For example, there may be a custom content bundle for English and another custom content bundle for French. When a computer program is executed, the statements are evaluated to identify the value of the customization parameter and then to retrieve the associated content from the custom content bundle associated with the identified value. In this way, a computer programmer can specify a default value and on a statement-by-statement basis override the default value with a statement-specific value.

In one embodiment, the content need not be limited to text but may also include other types of content such as images and code. The customization system may use a separate custom content bundle for each type of content. For example, one custom content bundle may contain text for English, and another custom content bundle may contain images for English. The images of a computer program can be customized to the country. For example, an image of the Statue of Liberty may be appropriate when the computer program is used by a U.S. citizen, whereas an image of Buckingham Palace may be appropriate when used by a British citizen. Also, the code and scripts used by a program may be customized to the country, gender, and so on. For example, currency may be displayed in dollars when the computer program is used in the U.S. and in pounds when used in the U.K. The use of the fine-grain customization can be used to override the default value for a customization parameter associate with code. For example, most money amounts of a computer program may be displayed in dollars, whereas it may be necessary to display some in pounds or euros.

Figure 1B:
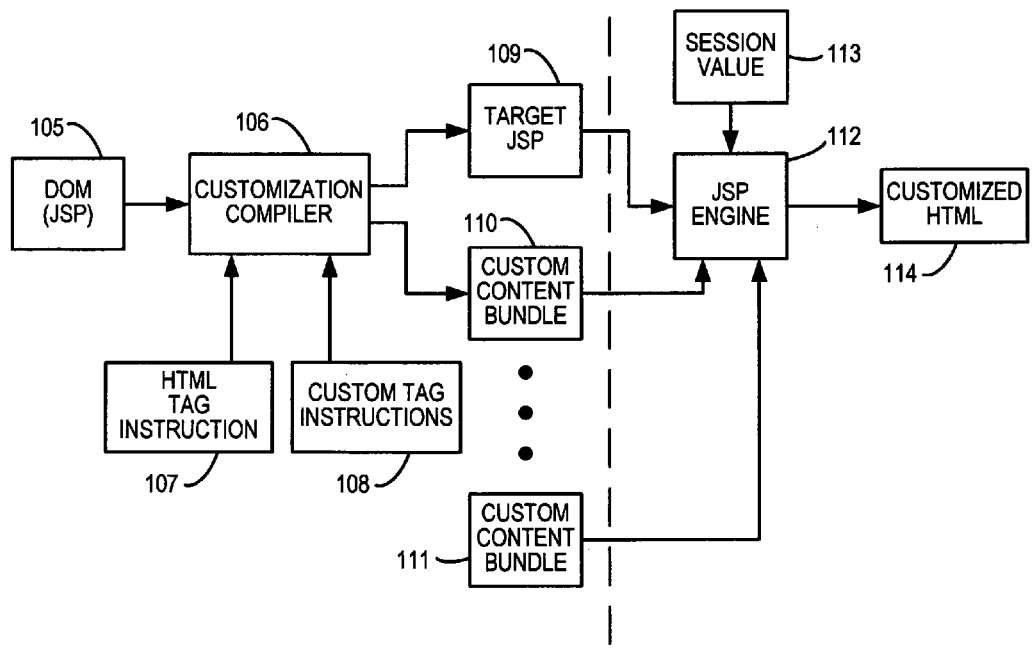
FIG. 1B is a block diagram illustrating the compilation and execution of a JSP by the customization system in one embodiment.

FIGS. 1A and 1B are block diagrams illustrating the processing of the customization system in one embodiment. FIG. 1A is a block diagram illustrating preprocessing of a JSP before it is "compiled." In this description, the term "compile" refers to the process of modifying a computer program to support customization. The customization system preprocesses a JSP to put it in a format that facilitates the compilation of the JSP. In one embodiment, the preprocessing generates a document object model ("DOM") formatted version of the JSP. The DOM version of the JSP is a tree representation of the tag hierarchy of the JSP. A source JSP 101 is processed by a JSP-to-XML translator 102 to generate an XML version 103 of the source JSP. (XML refers to the Extensible Markup Language.) Since JSP tags adhere to the XML syntax, only a few exceptions need to be handled. These exceptions include various JSP directives and code declarations within a JSP. The JSP-to-XML translator translates these JSP tags into equivalent custom tags that adhere to the XML syntax. In addition, the customization system may convert HTML tags of the JSP to well-formed XHTML tags using a translator such as HTML Tidy (http://www.w3.org/People/Raggett/tidy/). The XML-to-DOM translator 104 translates the XML version of the source JSP into a DOM version 105 of the source JSP using a translator such as Xerces XML Parser (http://xml.apache.org). One skilled in the art will appreciate that the preprocessing of a source JSP is optional and that the customization system may directly compile the source JSP, rather than a DOM version of the source JSP.

FIG. 1B is a block diagram illustrating the compilation and execution of a JSP by the customization system in one embodiment. The customization compiler 106 compiles a DOM version 105 of the source JSP into a target JSP 109. The customization compiler also generates a custom content bundle 110. The customization compiler inputs HTML tag instructions 107 and custom tag instructions 108. The tag instructions specify how to customize each type of tag of a JSP. The customization compiler traverses the DOM tree compiling each tag. The customization compiler compiles a tag by retrieving its corresponding instructions, identifying the content of the tag, storing that content in the custom content bundle, and replacing that content in the tag with an include content tag that references the content in the custom content bundle. After the custom content bundle is created, additional custom content bundles 111 may be created to support different values of the customization parameter. For example, if the language of the source JSP is English, then the custom content bundle created by the customization compiler would be for English. The additional custom content bundles may be for other languages such as French. The target JSP is available to be installed and executed as part of a web site. The JSP engine 112 is used to execute the target JSP's. In one embodiment, the web site tracks user sessions. A user session may be initiated by a user logon and terminated by a user logoff. A user session may also be initiated when a request to access a web page of the web site is received when the user is not currently in a session. A session may also be terminated when no request from the user has been received for a certain period. When a session is initiated, the web site establishes attributes for that session which may include a default value 113 for the customization parameter. For example, if the customization parameter relates to language, then the default value for a user in the United States may be English. When the JSP engine executes a JSP page, it uses the default value for the customization parameter established when a session was initiated. The JSP engine then executes the JSP page to generate a customized HTML document 114. The JSP engine processes each tag. When the tag includes an include content tag, the JSP engine retrieves the content from the custom content bundle for the effective value of the customization parameter. The effective value is the default value, unless the default value is overridden by an attribute of the tag. JSP tags may be developed specifically to support customization. The code for such a JSP tag would be developed to access the appropriate custom content bundle using the default value of the customization parameter to retrieve the appropriate content. If the tag also has an attribute for the customization parameter, then the value of that attribute overrides the default value. When the code for a JSP tag is executed, it generates a portion of the customized HTML page. When the JSP engine processes an HTML tag, it may process any include content tags and then copy the HTML tag with the included content to the customized HTML page.

Tables 1–3 illustrate a source JSP and a corresponding target JSP and custom content bundle generated by the customization compiler in one embodiment. Table 1 contains a portion of a source JSP. Table 2 contains the corresponding portion of a target JSP that results from the compilation of the source JSP. Table 3 contains the custom content bundle generated during the compilation of the source JSP.

Line 4 of Table 1 contains an HTML title tag that contains a body with the text content of "User Search." Lines 4–6 of Table 2 contain the include content tag that the customization compiler inserted to replace the content. The inserted include content tag is <dialecttags:IncludeContentTag locale="<%=_effectivelocale%>" contentID="user-search-1"/>. In this example, the customization is localization. The include content tag is a custom JSP tag that has two attributes: locale and contentID. The locale attribute is set to the default value that is stored in the variable space "_effectivelocale" that was established when the user's session was initiated. The contentID attribute is set to the value associated with the name "user-search-1" in the custom content bundle. The custom content bundle at line 3 contains the corresponding name and value pair: "user-search-1=User Search."

Lines 6–9 of Table 1 illustrate a custom tag with the name "dialecttags:OutputHtmlTitleTag" with attributes pageTitle, fontFace, fontSize, and fontColor. The tag instructions for this tag indicate that the pageTitle attribute is to have its text customized. Line 9 of Table 2 illustrates the corresponding include content tag inserted by the customization compiler. In this example, the include content tag is a JSP expression that is executed by the JSP engine. The JSP expression retrieves the content identified by the contentID of "user-search-2" from the custom content bundle. The object_rmb is a resource bundle manager object that is instantiated by the JSP engine. The JSP engine then sets the pageTitle attribute with the retrieved content. Line 4 of Table 3 illustrates that the content of "Find Existing Accounts—Results" is associated with the contentID of "user-search-2."

TABLE 1

Source JSP

```
1.   <!DOCTYPE HTML PUBLIC "-//W3C//DTD HTML 4.0//EN">
2.   <HTML>
3.       <HEAD>
4.           <TITLE><. . .>: User Search</TITLE>
5.       </HEAD>
6.       <dialecttags:OutputHtmlTitleTag pageTitle="Find Existing Accounts -- Results"
7.           fontFace="Arial, Helvetica, sans-serif"
8.           fontSize="4"
9.           fontColor="Blue"/>
10.          ..
11.      <P>Type in information in one or more of the input fields to specify the search criteria used to find a user
         account. The information provided in the input fields will be used to provide a list of possible matches, so providing
         partial information will help narrow the search.
12.      </P>
13.
14.      <dialecttags:FormTag name="DisplayTableForm">
15.          <dialecttags:DisplayTableTag resultSet=" . . . "
16.              resultSetDisplayRules=" . . . "
17.              totalPages=" . . . "/>
18.              <dialecttags:ColumnHeadingTag columnID="1" headingText="Company Name"/>
19.              <dialecttags:ColumnHeadingTag columnID="2" headingText="First Name"/>
20.              <dialecttags:ColumnHeadingTag columnID="3" headingText="Last Name"/>
21.              <dialecttags:ColumnHeadingTag columnID="4" headingText="Logon ID"/>
22.              <dialecttags:ColumnHeadingTag columnID="5" headingText="Email"/>
23.          </dialecttags:DisplayTableTag>
24.      </dialecttags:FormTag>
25.   .
26.      <P>To further refine your search criteria, type in information in one or more of the input fields to specify the
         search criteria used to find a user account. The information provided in the input fields will be used to provide a list
         of
         possible matches, so providing partial information will help narrow the search.
27.      </P>
28.   . . .
29.      <TH ALIGN=RIGHT>First Name:</TH>
30.          <TD ALIGN="LEFT">
31.              <dialecttags:TextTag name="firstName"
32.                  focusMessage="Type in the first name of the user you wish to find"
33.                  displayLength="25"
34.                  maxLength="30"
35.                  type="text" value=" . . . "/>
36.          </TD>
37.      <TH ALIGN=RIGHT>Last Name:</TH>
38.   . . .
```

TABLE 2

Target JSP

1. <!DOCTYPE HTML PUBLIC "-//W3C//DTD HTML 4.0//EN">
2. <HTML>
3.    <HEAD>
4.       <TITLE><...>: <dialecttags:IncludeContentTag
5.           locale="<%= _effectiveLocale %>"
6.           contentID="user-search-1" /></TITLE>
7.    </HEAD>
8.    <dialecttags:OutputHtmlTitleTag
9.      pageTitle="<%= _rbm.getString(\"attextresources\", \"user-search-2\", _effectiveLocale) %>"
10.      fontFace="Arial, Helvetica, sans-serif"
11.      fontSize="4"
12.      fontColor="Blue"/>
13.    ...
14.    <P><dialecttags:IncludeContentTag
15.      locale="<%= _effectiveLocale %>"
16.      contentID="user-search-3" />
17.    </P>
18.    <dialecttags:FormTag name="DisplayTableForm">
19.      <dialecttags:DisplayTableTag resultSet="..."
20.          resultSetDisplayRules="..."
21.          totalPages="..."/>
22.          <dialecttags:ColumnHeadingTag columnID="1" headingText="<%= _rbm.getString(\"attextresources\", \"user-search-4\", _effectiveLocale) %>"/>
23.          <dialecttags:ColumnHeadingTag columnID="2" headingText="<%= _rbm.getString(\"attextresources\", \"user-search-5\", _effectiveLocale) %>"/>
24.          <dialecttags:ColumnHeadingTag columnID="3" headingText="<%= _rbm.getString(\"attextresources\", \"user-search-6\", _effectiveLocale) %>"/>
25.          <dialecttags:ColumnHeadingTag columnID="4" headingText="<%= _rbm.getString(\"attextresources\", \"user-search-7\", _effectiveLocale) %>"/>
26.          <dialecttags:ColumnHeadingTag columnID="5" headingText="<%= _rbm.getString(\"attextresources\", \"user-search-8\", _effectiveLocale) %>"/>
27.      </dialecttags:DisplayTableTag>
28.    </dialecttags:FormTag>
29. ...
30.    <P><dialecttags:IncludeContentTag
31.      locale="<%= _effectiveLocale %>"
32.      contentID="user-search-9" />
33.    </P>
34. .
35.    <TH ALIGN=RIGHT><dialecttags:IncludeContentTag
36.          locale="<%= _effectiveLocale %>"
37.          contentID="user-search-10" /></TH>
38.    <TD ALIGN="LEFT">
39.      <dialecttags:TextTag name="firstName"
40.        focusMessage="<%= _rbm.getString(\"attextresources\", \"user-search-11\", _effectiveLocale) %>"
41.        displayLength="25"
42.        maxLength="30"
43.        type="text" value="..."/>
44.    </TD>
45.    <TH ALIGN=RIGHT><dialecttags:IncludeContentTag
46.      locale="<%= _effectiveLocale %>"
47.      contentID="user-search-12" /></TH>
48. ...

TABLE 3

Custom Content Bundle

1. <Resource Bundle>
2. 
3. user-search-1=User Search
4. user-search-2=Find Existing Accounts -- Results
5. user-search-3=Type in information in one or more of the input fields to specify the search criteria used to find a user account. The information provided in the input fields will be used to provide a list of possible matches, so providing partial information will help narrow the search.
6. user-search-4=Company Name
7. user-search-5=First Name
8. user-search-6=Last Name
9. user-search-7=Logon ID
10. user-search-8=Email
11. user-search-9=To further refine your search criteria, type in information in one or more of the input fields to specify the search criteria used to find a user account. The information provided in the input fields will be used to provide a list of possible matches, so providing partial information will help narrow the search.

TABLE 3-continued

Figure 2:
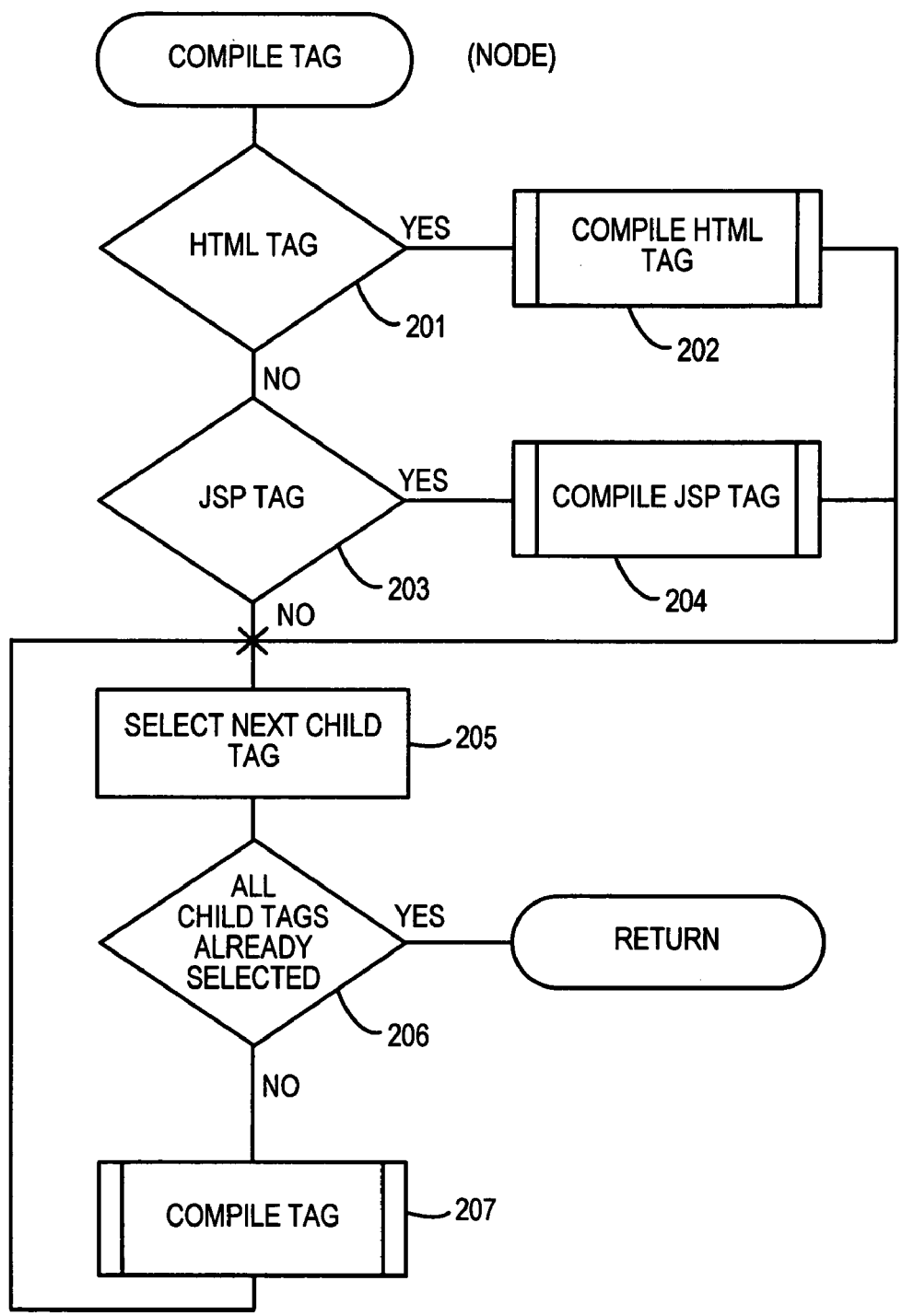
FIG. 2 is a flow diagram illustrating the processing of a compile tag component in one embodiment.

Custom Content Bundle 12. user-search-10=First Name:
13. user-search-11=Type in the first name of the user you wish to find
14. user-search-12=Last Name:

FIGS. 2–5 are flow diagrams illustrating the processing of the customization compiler in one embodiment. FIG. 2 is a flow diagram illustrating the processing of a compile tag component in one embodiment. The compile tag component is invoked by the customization compiler passing the root node of the DOM version of the source JSP. The component compiles that tag and recursively invokes the compile tag component for each child tag. In decision block 201, if the passed node represents an HTML tag, then the component continues at block 202, else the component continues at block 203. In block 202, the component invokes the compile HTML tag component and continues at block 205. In decision block 203, if the passed node represents a JSP tag, then the component continues at block 204, else the component continues at block 205. In block 204, the component invokes the compile JSP tag component and continues at block 205. In blocks 205–207, the component loops recursively invoking the compile tag component for each child tag of the tag of the passed node. In block 205, the component selects the next child tag of the passed node. In decision block 206, if all the child tags of the passed node have already been selected, then the component returns, else the component continues at block 207. In block 207, the component recursively invokes the compile tag component to compile the node associated with the selected child tag and then loops to block 205 to select the next child tag.

Figure 3:
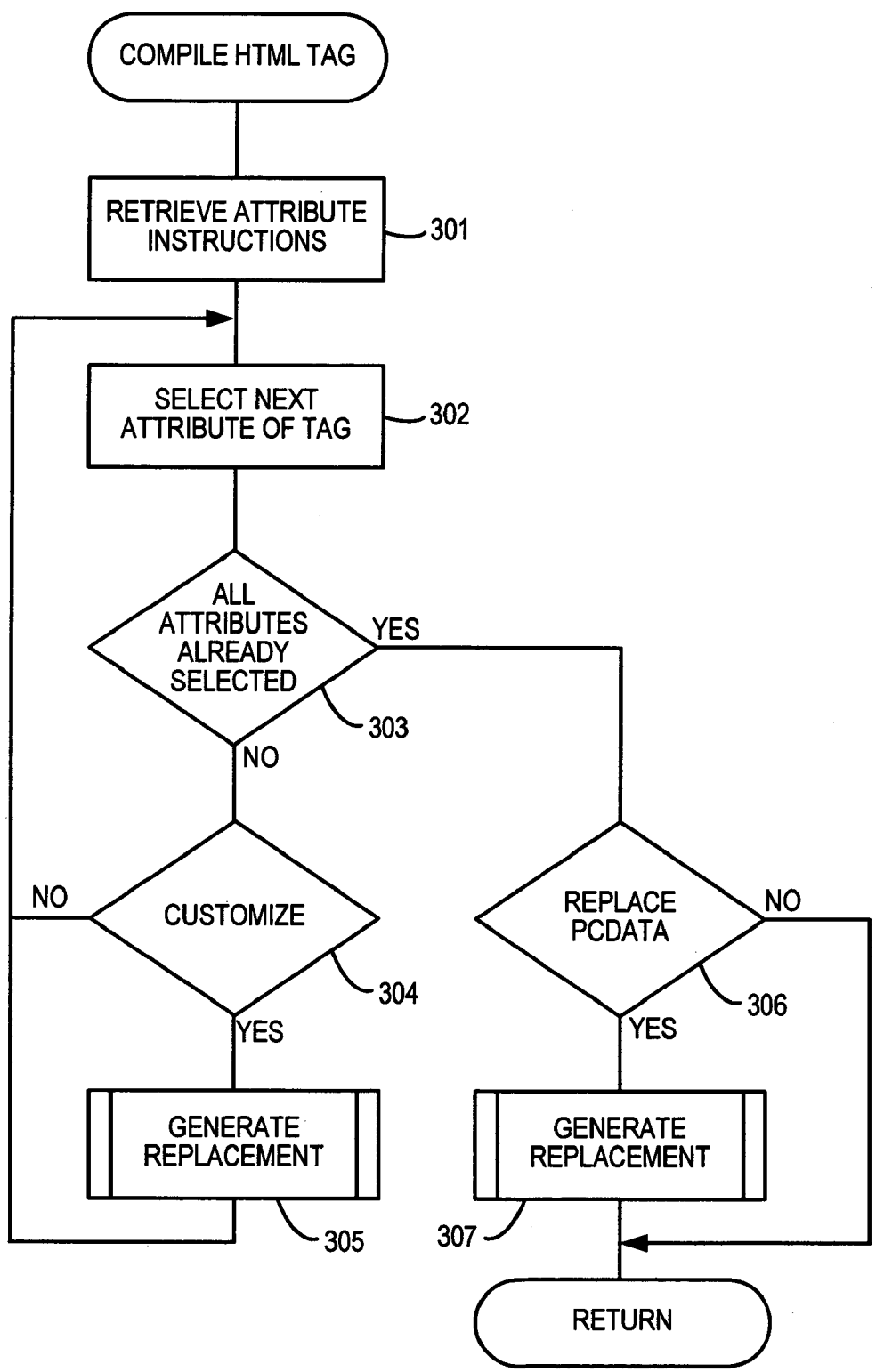
FIG. 3 is a flow diagram illustrating the processing of a compile HTML tag component in one embodiment.

FIG. 3 is a flow diagram illustrating the processing of the compile HTML tag component in one embodiment. The component is passed an HTML tag and performs the appropriate customization processing. In block 301, the component retrieves the instructions for the passed HTML tag from the HTML tag instructions. Table 4 lists sample instructions. In blocks 302–305, the component loops processing each attribute of the tag. In block 302, the component selects the next attribute of the passed HTML tag. In decision block 303, if all the attributes of the passed HTML tag have already been selected, then the component continues at block 306, else the component continues at block 304. In block 304, if content of the selected attribute is to be customized, then the component continues at block 305, else the component loops to block 302 to select the next attribute of the tag. In block 305, the component invokes the generate replacement component to customize the selected attribute and then loops to block 302 to select the next attribute of the tag. The component performs a similar process for attributes that have a client-side JavaScript ("CSJS") that may need to be customized. In decision block 306, if the PCDATA of the passed HTML tag is to be customized, then the component continues at block 307, else the component returns. In block 307, the component invokes the generate replacement component to replace the PCDATA of the HTML tag. The component then returns.

TABLE 4

| HTML Tag | PCDATA | Attribute | Instructions |
|---|---|---|---|
| A | Y | title | replace |
|   |   | on*event | CSJS |
| . . . |   |   |   |
| P | Y | title | replace |
|   |   | on*event | CSJS |
| . . . |   |   |   |
| Title | Y | (none) |   |

Table 4 contains an entry for each HTML tag. The PCDATA column indicates whether the PCDATA of the tag should be customized. Each attribute that is to be customized is listed along with the instructions indicating how to customize. The "replace" instruction indicates that the text for the attribute should be customized by replacing the text with an include content tag. The "CSJS" instruction indicates that the associated client-side JavaScript should be customized. The customization compiler will replace text associated with the event attributes (e.g., onMouseOver) with include content commands.

Figure 4:
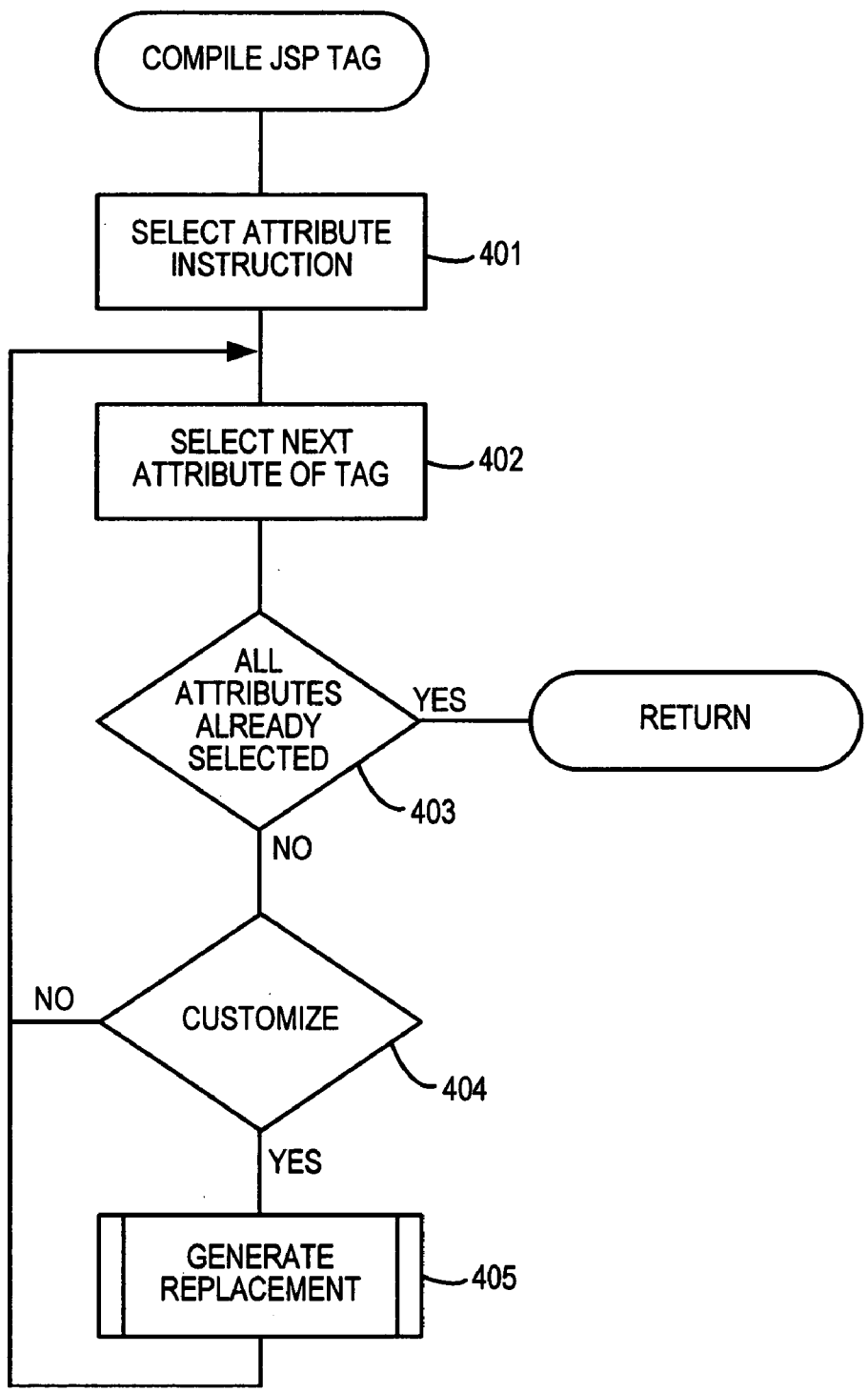
FIG. 4 is a flow diagram illustrating the processing of a compile JSP tag component in one embodiment.

FIG. 4 is a flow diagram illustrating the processing of the compile JSP tag component in one embodiment. The component is passed a JSP tag and performs the appropriate customization processing. In block 401, the component selects the JSP tag instructions for the passed tag from the custom tag instructions. Table 5 lists sample instructions. In blocks 402–405, the component loops processing each attribute of the tag. In block 402, the component selects the next attribute of the passed JSP tag. In decision block 403, if all the attributes of the passed JSP tag have already been selected, then the component returns, else the component continues at block 404. In decision block 404, if content of the selected attribute is to be customized, then the component continues at block 405, else the component loops to block 402 to select the next attribute of the tag. In block 405, the component invokes the generate replacement component to customize the selected attribute and then loops to block 402 to select the next attribute of the tag.

TABLE 5

| Tag | Attributes | Instructions |
|---|---|---|
| dialecttags:OutputHTMLTitleTag | pageTitle | replace |
|  | fontFace | ——— |
|  | fontSize | ——— |
|  | fontColor | ——— |
|  | local | ——— |
| . . . |  |  |
| dialecttags:FamTagP | name | ——— |
| . . . |  |  |
| dialecttags:ColumnHeadingTag | columnID | ——— |
|  | headingText | replace |
|  | locale | ——— |

Table 5 contains an entry for each custom JSP tag. The attribute column lists the attributes of each tag, and the instructions column indicates whether the text associated with that attribute should be customized. The locale attribute of the dialecttag:OutputHTMLTitleTag is an example of a customization parameter that can be set on this tag. The locale attribute represents the language. If the locale attribute is not set in this tag, then the language for the pageTitle attribute is the default language. Otherwise, it is the language specified by the attribute.

Figure 5:
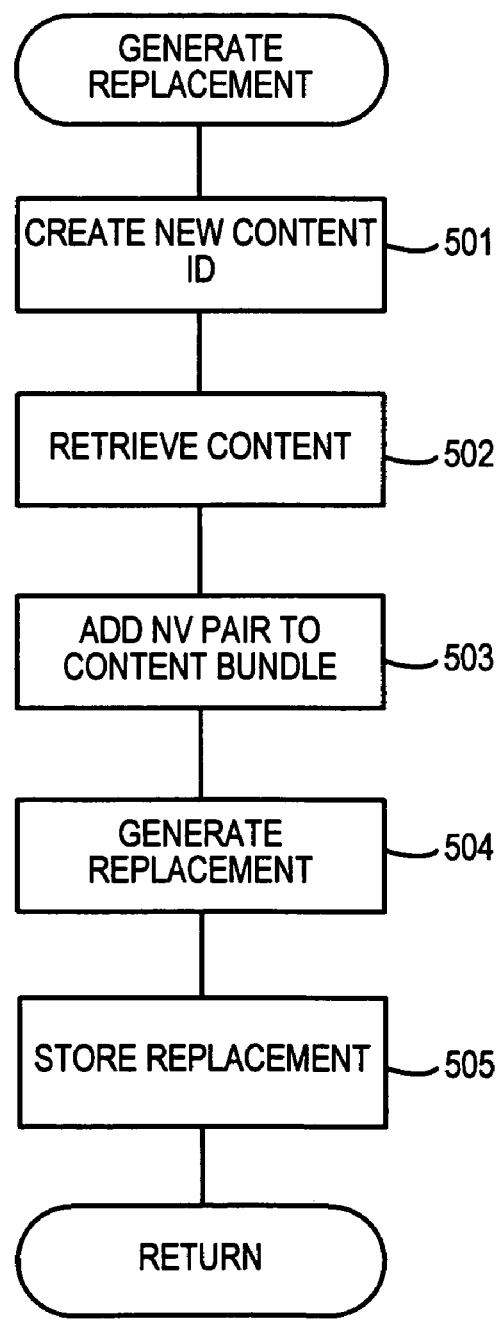
FIG. 5 is a flow diagram illustrating the processing of a generate replacement component in one embodiment.

FIG. 5 is a flow diagram illustrating the processing of the generate replacement component in one embodiment. This component replaces content of a tag with an include content tag and stores the content in the custom content bundle. In block 501, the component creates a new content identifier. In one embodiment the content identifier is the name of the DOM version of the JSP followed by a unique number (e.g., user-search-1, user-search-2, and so on). In block 502, the component retrieves the content from the attribute or the PCDATA in accordance with the tag instructions. In block 503, the component adds a name and value pair to the custom content bundle that maps of the content identifier to the retrieved content. In block 504, the component generates the include content tag replacement for the content. In block 505, the component stores the replacement for the content into the tag and then returns.

Figure 6:
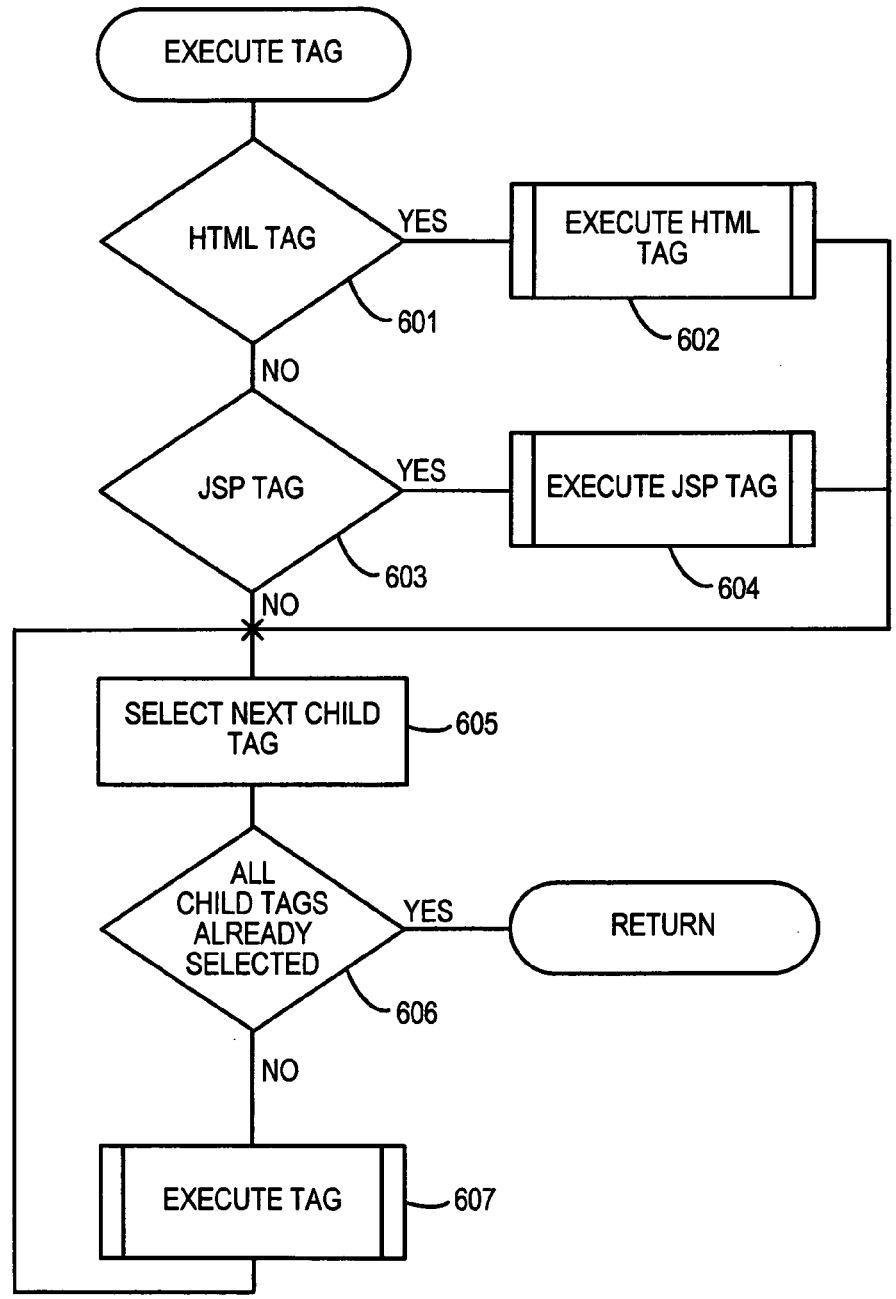
FIG. 6 is a flow diagram illustrating the processing of an execute tag component in one embodiment.

FIGS. 6–10 are flow diagrams illustrating the processing of a target JSP by a JSP engine in one embodiment. FIG. 6 is a flow diagram illustrating the processing of the execute tag component in one embodiment. The execute tag component is invoked by the JSP compiler to execute a JSP tag. It is initially invoked passing the root tag of the JSP. The component recursively invokes the execute tag component to process each child tag. In decision block 601, if the passed tag is an HTML tag, then the component continues at block 602, else the component continues at block 603. In block 602, the component executes the HTML tag and continues at block 605. The execution of an HTML tag may entail copying the HTML tag to an output HTML document. Before copying the HTML tag, the component executes the include content tags of the HTML tag to retrieve the content from the custom content bundle and insert the retrieved content into the HTML tag. In decision block 603, if the passed tag is a JSP tag, then the component continues at block 604, else the component continues at block 605. In block 604, the component invokes the execute JSP tag component and continues at block 605. In blocks 605–607, the component loops recursively invoking the execute tag component for each child tag. In block 605, the component selects the next child tag of the passed tag. In decision block 606, if all the child tags of the passed tag have already been selected, then the component returns, else the component continues at block 607. In block 607, the component recursively invokes the execute tag component passing the selected child tag and then loops to block 605 to select the next child tag.

Figure 7:
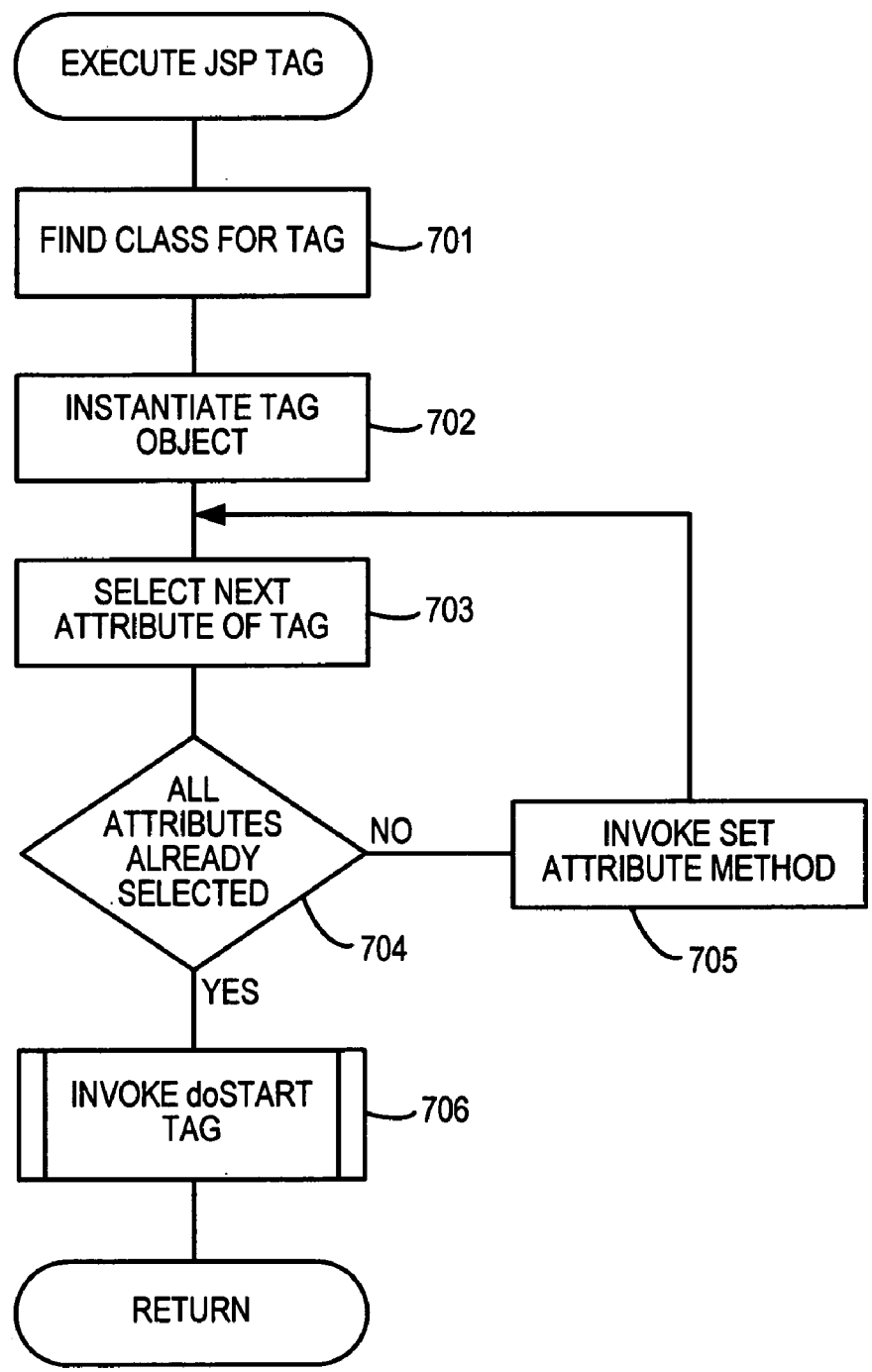
FIG. 7 is a flow diagram illustrating the processing of an execute JSP tag component in one embodiment.

FIG. 7 is a flow diagram illustrating the processing of the execute JSP tag component in one embodiment. The component is passed a JSP tag and instantiates an object associated with the passed tag, sets the attributes of the object, and invokes a method of the object to generate the HTML associated with the passed tag. In block 701, the component identifies the object class associated with the passed tag. In block 702, the component instantiates a tag object for the identified object class. One skilled of the art will appreciate that the component may reuse a tag object that was previously instantiated. The initialization method (e.g., constructor) may initialize the customization parameter (e.g., locale) to the default value for the customization parameter. In particular, the initialization method may access the session information for the user to identify the default value. In blocks 703–705, the component sets the attributes for the tag object. In block 703, the component selects the next attribute of the tag. In decision block 704, if all the attributes of the tag have already been selected, then the component continues at block 706, else the component continues at block 705. In block 705, the component invokes the appropriate set attribute method of the tag object to set the attribute value specified in the tag. The selected attribute may have an include content tag. If so, before setting the attribute value, the component retrieves the corresponding content from the custom content bundle and sets the attribute with the retrieved content. The component then loops to block 703 to select the next attribute of the tag. In block 706, the component invokes the processing method of the tag object (e.g., doStartTag) to allow the tag object to generate of the HTML corresponding to the tag. The component then returns.

Figure 8:
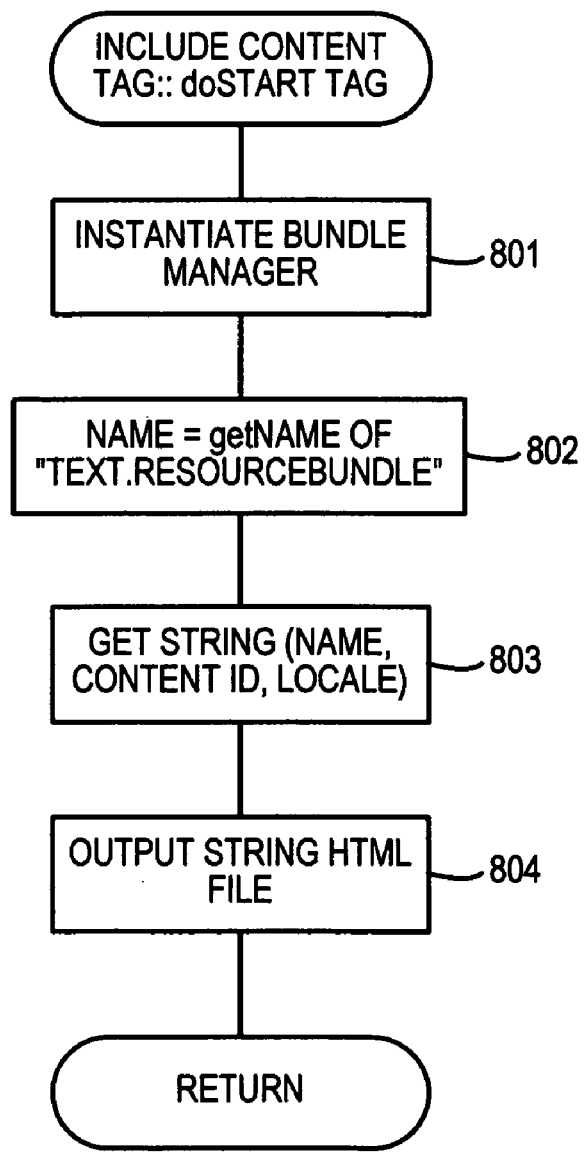
FIG. 8 is a flow diagram illustrating the processing of an example doStartTag method in one embodiment.

FIG. 8 is a flow diagram illustrating the processing of an example doStartTag method in one embodiment. In this example, the method corresponds to an include content tag (i.e., IncludeContentTag). This tag corresponds to an include content tag in one embodiment. In block 801, the method instantiates a resource bundle manager object (e.g., _rbm), which provides an interface to the custom content bundles. In block 802, the method determines the name of the resource bundle to be accessed. Each application (e.g., a set of related web pages) may have associated base name of for its text, image, and code custom content bundles. The actual name of the custom content bundle to be accessed may be generated by concatenating the value of the customization parameter with the base name. For example, if the base name for the text custom content bundle of an application is "user-search-text" and the value of the customization parameter is "English," then the actual name may be "user-search-text-English." In block 803, the method retrieves the content associated with the base name, content identifier, and value of the customization parameter. The content identifier is set by a set method of the tag object. The value for the customization parameter is set upon initialization of the tag object and may be overridden by a customization parameter attribute of the tag (e.g., locale). In block 804, the component outputs the retrieved content to the HTML document and then returns.

Figure 9:
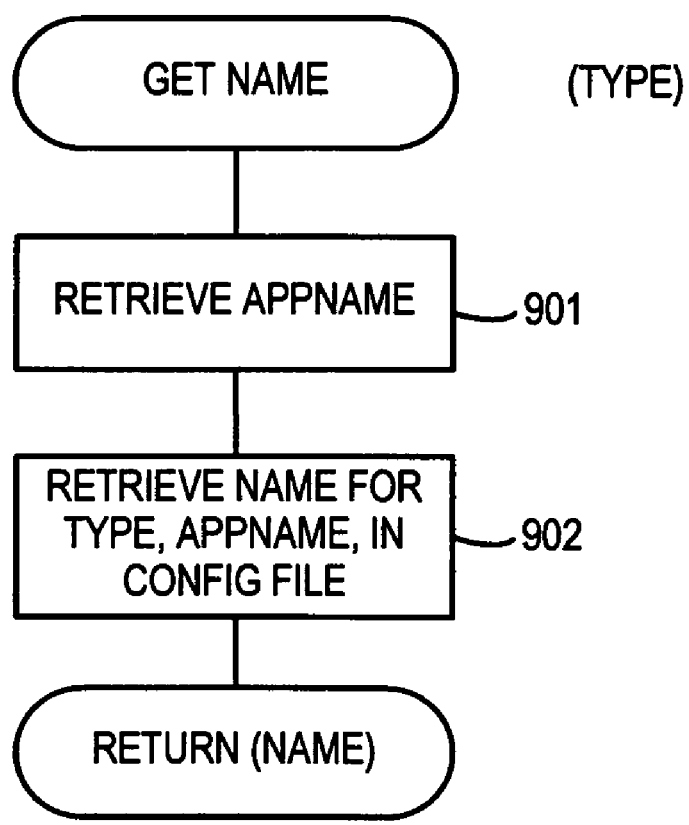
FIG. 9 is a flow diagram illustrating the processing of a get name component in one embodiment.

FIG. 9 is a flow diagram illustrating the processing of the get name component in one embodiment. The component is passed the type of a custom content bundle, such as text, and returns the base name of the custom content bundle for the application. In block 901, the component retrieves the application name from the session data. In block 902, the component retrieves the name for the passed type and retrieved application name from a configuration file. The configuration file may contain a mapping of type and application name pairs to the corresponding base name for the custom content bundles. The component then returns the retrieved base name.

Figure 10:
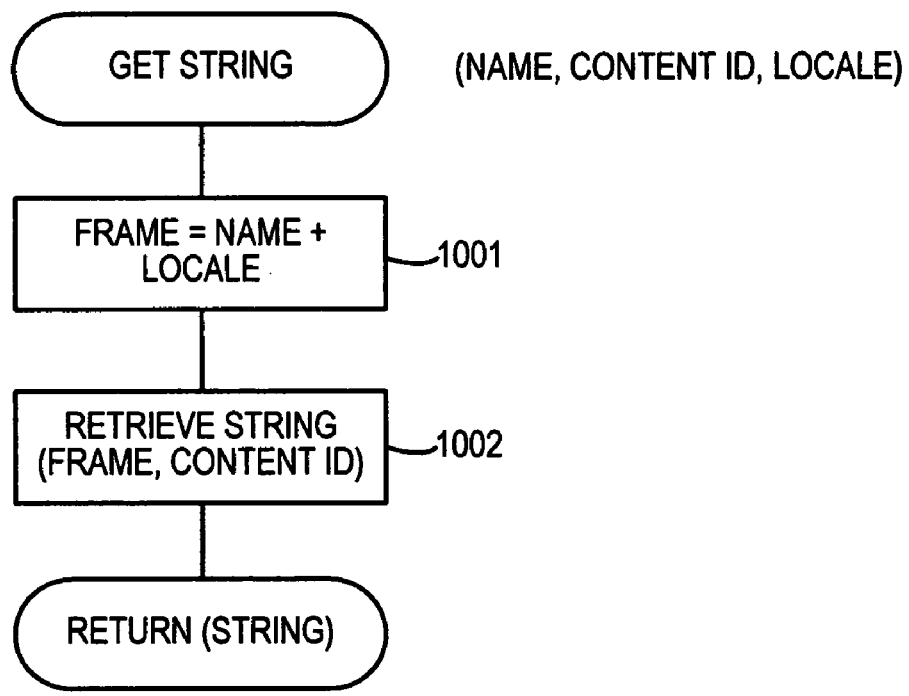
FIG. 10 is a flow diagram illustrating the processing of a retrieve string component in one embodiment.

FIG. 10 is a flow diagram illustrating the processing of the retrieve string component in one embodiment. The component retrieves content from a custom content bundle. The component is passed the base name of the custom content bundle, the content identifier, and the value of the customization parameter. In block 1001, the component creates the actual name of the custom content bundle by concatenating the base name with the value of the customization parameter (e.g., "user-search-text-English"). In block 1002, the component retrieves the content identified by the passed contentID from the custom content bundle and then returns the content.

From the above description, it will be appreciated that although specific embodiments of the customization system have been described for purposes of illustration, various modifications may be made without deviating from the scope of the invention. For example, one skilled in the art will appreciate that a program may have multiple customization parameters such as one for language and another for gender. One skilled in the art will appreciate that a variety of different data structures other than resource bundles, such as a database, can be used to store the content. Accordingly, the invention is not limited except by the following claims.

What is claimed is:

1. A method in a computer system for preparing a program for customization, the method comprising:
   for a plurality of statements of the program,
      retrieving the statement;
      identifying automatically by computer system a type of the retrieved statement; and
      when the identified type indicates that statements of that type can be customized,
         identifying content of the statement that can be customized;
         automatically storing the identified content in a custom content bundle so that identified content can be later retrieved from the custom content bundle using a content identifier, the content identifier not including the identified content; and
         automatically replacing the identified content in the retrieved statement with an include content command having the content identifier so that when the include content command is processed, it retrieves content from a custom content bundle using the content identifier.

2. The method of claim 1 wherein the program is a server-executable web page and wherein the statements are tags.

3. The method of claim 2 wherein the statements are custom JSP tags.

4. The method of claim 2 wherein the statements are HTML tags.

5. The method of claim 2 wherein the server-executable web page is a JavaServer page.

6. The method of claim 2 wherein the server-executable web page is an active server page.

7. The method of claim 1 wherein the content is text.

8. The method of claim 1 wherein the customization is language localization.

9. The method of claim 1 wherein a custom content bundle from which the content is retrieved when processing the include content command is different from the custom content bundle in which the identified content is stored.

10. The method of claim 9 wherein the different custom content bundles represent content in different languages.

11. A computer system for preparing a statement of a program for customization, comprising:
   a component that determines whether the statement is of a type that can be customized; and
   a component that identifies content of the statement that can be customized, that stores the identified content in a custom content bundle so that identified content can be later retrieved from the custom content bundle using a content identifier, and that replaces the identified content in the retrieved statement with an include content command having the content identifier so that when the include content command is processed, the content from a custom content bundle is retrieved using the content identifier, the content identifier not including the identified content.

12. The computer system of claim 11 wherein the program is a server-executable web page and wherein the statements are tags.

13. The computer system of claim 12 wherein the statements are custom JSP tags.

14. The computer system of claim 12 wherein the statements are HTML tags.

15. The computer system of claim 12 wherein the server-executable web page is a JavaServer page.

16. The computer system of claim 12 wherein the server-executable web page is an active server page.

17. The computer system of claim 11 wherein the content is text.

18. The computer system of claim 11 wherein the customization is language localization.

19. The computer system of claim 11 wherein a custom content bundle from which the content is retrieved when processing the include content command is different from the custom content bundle in which the identified content is stored.

20. The computer system of claim 19 wherein the different custom content bundles represent content in different languages.

21. A computer system for preparing a statement of a program for customization, comprising:
   means for determining whether the statement is of a type that can be customized;
   means for identifying content of the statement that can be customized;
   means for storing the identified content in a custom content bundle using a content identifier, the content identifier not including the identified content; and
   means for replacing the identified content in the retrieved statement with an include content command having the content identifier.

22. The computer system of claim 21 wherein the program is a server-executable web page and wherein the statements are tags.

23. The computer system of claim 21 wherein the content is text.

24. The computer system of claim 21 wherein the customization is language localization.

25. The computer system of claim 21 wherein a custom content bundle from which the content is retrieved when processing the include content command is different from the custom content bundle in which the identified content is stored.

26. The computer system of claim 25 wherein the different custom content bundles represent content in different languages.

* * * * *